United States Patent [19]

Miserlis et al.

[11] 4,137,387

[45] Jan. 30, 1979

[54] EQUIPMENT FOR HANDLING SPENT-AQUEOUS ZIEGLER TYPE CATALYST IN THE POLYMERIZATION OF OLEFINS

[75] Inventors: Constantine D. Miserlis, Arlington; Peter J. Lewis, Andover, both of Mass.

[73] Assignee: The Badger Company, Inc., Cambridge, Mass.

[21] Appl. No.: 728,155

[22] Filed: Sep. 30, 1976

[51] Int. Cl.² .................................................. C08F 6/28
[52] U.S. Cl. ........................................ 526/62; 422/135; 422/241; 526/84; 528/499
[58] Field of Search ................. 526/62, 84; 23/252 A; 528/499

[56] References Cited

U.S. PATENT DOCUMENTS 2,899,433  8/1959  Robinson et al. ................. 260/249.7

OTHER PUBLICATIONS

The Condensed Chemical Dictionary, Eighth Ed., (1971), p. 405.

*Primary Examiner*—Stanford M. Levin
*Attorney, Agent, or Firm*—Sewall P. Bronstein

[57] ABSTRACT

In the polymerization under pressure of liquid olefin to polyolefin using a Ziegler type catalyst in which the reaction mass, comprising a mixture of catalyst and polyolefin dissolved in liquid monomer, is mixed in a mixer with water to kill the catalyst and reaction after which the highly corrosive aqueous solution of Ziegler catalyst is separated from the monomer and dissolved polymer in a settling tank; lining the inner wall of the mixer and/or settling tank and/or any other part of the equipment coming into contact with the aqueous Ziegler catalyst solution with an acid resistant brick lining having an intermediate membrane lining between it and such inner wall and in which the mortar of the brick lining is a carbon-filled furan polymer, in which the membrane is a fiber glass reinforced furan polymer and in which the brick lining is cemented to the membrane and the membrane is cemented to the inner wall by a carbon-filled furan polymer adhesive.

3 Claims, 2 Drawing Figures

4,137,387

EQUIPMENT FOR HANDLING SPENT-AQUEOUS ZIEGLER TYPE CATALYST IN THE POLYMERIZATION OF OLEFINS

THE PROBLEM

In the catalytic liquid phase polymerization under positive pressure of olefins to polyolefins, such as polyethylene, polypropylene, polybutylene, etc., the reaction mass comprises polyolefin dissolved in liquid monomer. Water is mixed in a high shear, high intensity mixer with the reaction mass from the reactor to kill the catalyst and thereby stop further reaction. A function of the mixer is to intimately contact the water with the Ziegler catalyst to substantially completely dissolve the catalyst in the water. The reaction mass and aqueous solution of catalyst are then passed to a settling tank in which the heavier water with catalyst dissolved therein is separated from the lighter reaction mass (polymer dissolved in monomer) as a lower layer. The liquid monomer in the reaction mass, after removal of water and catalyst in the settler tank, is separated from the polymer dissolved therein by flashing the monomer off from the polymer and the flashed monomer vapor is liquified and recycled back to the reactor after being admixed with fresh liquid monomer feed. Water is removed from the monomer recycle and fresh monomer feed before they are passed to the reactor and therein admixed with catalyst because the catalyst conventionally used in this process, i.e., Ziegler type catalyst, is highly sensitive to even minute amounts of water.

Zeigler type catalysts are conventionally titanium and alkyl aluminum halides. Accordingly, when water is admixed therewith to stop the reaction, the resulting aqueous solution of titanium and alkyl aluminum halides and halide acids is highly corrosive. Accordingly, the mixing equipment and the settling tank and accessories thereof, have either been made of or clad with monel, titanium or hastelloy, which are highly acid resistant metals.

However, a serious problem with the use of the aforementioned alloys is that they are exceedingly expensive and, accordingly, substantially increase capital investment. The cost of the alloy or alloy cladding for the settling tank is particularly high since it is substantial in size.

BRIEF DESCRIPTION OF THE INVENTION

In accordance with the present invention such capital investment cost is substantially reduced by use of a low cost steel, e.g., carbon steel or other metal, settling tank and/or mixer lined with a layer of acid resistant bricks, which are cemented (mortared) by a furan polymer cement or adhesive to each other and to a flexible furan polymer intermediate membrane lining between the brick layer and the inner wall of the tank and/or mixer, which membrane is itself cemented to the inner wall of the tank and/or mixer by a furan polymer cement or adhesive.

The various ports and flanges of the settling tank have the same inner lining or a slightly modified lining of generally the same construction using, instead of bricks, a more rigid furan resin sleeve with flexible furan polymer membrane cemented together and to the port wall with furan polymer cement.

It has been found that although the furan polymer mortared brick lining and furan polymer membrane of the present invention substantially reduces cost as compared to alloy or alloy cladding, it is at least as highly corrosion resistant to the aqueous acidic Ziegler catalyst solution. Furthermore, it is highly impervious to the aqueous Ziegler catalyst solution, is exceedingly resistant to leaching out by the polyolefin-in-monomer solution, and is extremely tough and resistant to cracking and wear.

The metal, e.g. carbon steel, settling tank has a greater coefficient of expansion than the furan polymer mortared brick layer. The flexible (stretchable) elastomeric furan polymer intermediate membrane liner cemented between the two of them permits relative thermal movement between them by stretching without cracking the mortared brick layer or injuring the metal tank.

The yieldability and stretchability of the flexible elastomeric cement layer between the membrane and mortared brick layer and between the membrane and metal shell and between adjacent bricks also permits this relative thermal movement without cracking the brick layer or damaging the shell. In effect, the membrane and the cement layers bonding it to the mortared brick layer and to the metal shell and the cement layers (mortar) between adjacent bricks become an integral flexible, elastomeric, yieldable layer which permits the aforesaid relative thermal movement.

The furan polymer cement layers between adjacent bricks and between the bricks and the membrane form one continuous, homogenous, flexible, yieldable, elastomeric but tough layer.

The bonds formed by the furan polymer cement with the bricks, the membrane and the metal shell are extremely strong and impervious to the aqueous Ziegler catalyst solution and to the polyolefin-in-olefin monomer solution.

A preferred furan polymer is a condensation polymer of furfuryl alcohol and a preferred brick is an oven-baked, vitrified silica and alumina brick.

The furan polymer mortared brick lining of the present invention is particularly highly resistant and impermeable to Ziegler catalyst solutions and polyolefin-in-liquid olefin monomer solutions, and although the furan polymer is tough and has high impact and tensile strength and is highly resistant to cracking or leaching out by the aforesaid polymer-in monomer solution, it accomodates nicely to relatively large differential thermal expansion or the shell and bricks.

Preferably the furan polymer membrane is reinforced with highly acid resistant fibers, such as fiber glass, and the cement or mortar is filled with acid resistant particulate filler such as carbon.

DESCRIPTION OF THE DRAWINGS

The advantages of the invention will be further understood from the following drawings and detailed descriptions thereof in which drawings

DETAILED DESCRIPTION OF THE INVENTION

Figure 1:
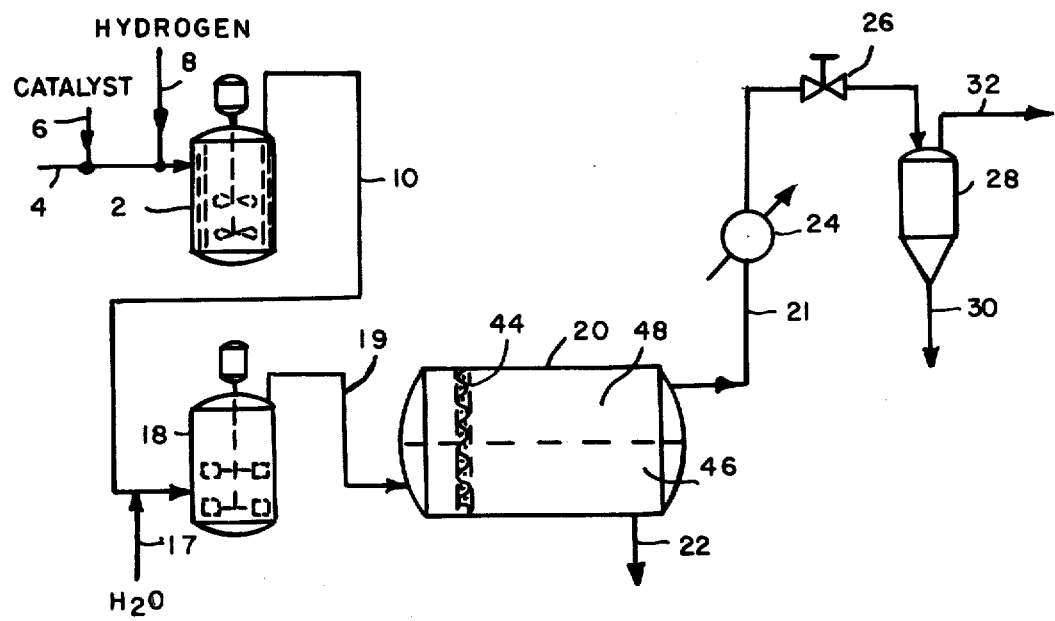
FIG. 1 is a schematic flow sheet of a method embodying the present invention.

With reference to the figures, 2 represents a reactor in which a mixture 4 of fresh liquid olefin monomer and liquid olefin recycle is admixed with a Ziegler type catalyst 6, made up of titanium tetrachloride and diethyl aluminum halide, and hydrogen 8 (to control polymer chain length) while being strongly agitated.

The highly viscous reaction mass, comprising polyolefin dissolved in liquid monomer, passes from reactor 2 via 10 to a Motionless mixer 18 sold under that name by Kenics Incorporated, or any other high shear, intensive mixer, where it is mixed with water 17 to kill the catalyst and thereby stop further reaction.

The reaction mass then passes from mixer 18 via 19 to one end of settling tank 20 in which the heavier water, having catalyst dissolved therein, is separated from the reaction mass as a lower layer and is removed at 22. The upper layer of reaction mass, still made up of polyolefin dissolved in liquid monomer passes from the other end of the settling tank 20 via 21 to a preheater 24 and thence through a flash (reducing) valve 26 over which there is a large pressure drop to flash off the more volatile monomer as a vapor from the polymer into a flash tank 28, from which the polymer is removed at 30 and is extruded, cooled and pelletized and from which the flashed monomer vapor flows via 32 to a quenching tower (not shown) where oligomers are stripped from the monomer vapor after which the monomer vapor is liquified and blended with fresh monomer feed and recycled to 4, after removal of water therefrom.

Figure 2:
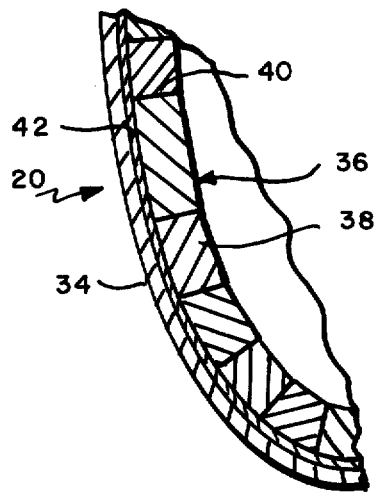
FIG. 2 is a schematic view in section and in elevation of a part of the wall of the settling tank of FIG. 1.

The settling tank 20 and mixer 18 are made up of an outer carbon steel shell, the inner wall of which is lined with a lining 36 (See FIG. 2 for a section of the wall of the settling tank — the mixer wall has the same construction) of highly acid resistant dense bricks 38 sold under the name SEMCO by Stebbins Engineering & Mfg. Company (oven baked, vitrified silica - alumina bricks) cemented or mortared together at 40 and to an underlying intermediate elastomeric, resilient and flexible furan polymer (condensation polymer of furfuryl alcohol) membrane 42 (⅛ inch thick) reinforced with glass fibers (sold under the name FURAGLASS 27 by Stebbins Engineering & Mfg. Company) by a highly acid resistant elastomeric, resilient and flexible furan polymer mortar or cement (condensation polymer of furfuryl alcohol) filled with inert carbon black particles and sold by Stebbins Engineering and Mfg company under the name AR-20-C mortar. Membrane 42 is in turn cemented by the same carbon-filled furan polymer adhesive to the inner wall of the carbon steel shell 34.

Any other furan polymer adhesives or cements can be used as well as any other filler therefor and any other reinforcing fibers for the membrane which are resistant to acid and polyolefin-in-olefin monomer solution.

The furan polymer cement or mortar layers cementing the bricks to each other and to the membrane form a continuous, homogenous, cohesive, elastomeric layer between adjacent bricks and between the underside of the bricks and the membrane.

Furthermore, the furan polymer cement mortar layer between adjacent bricks, the furan polymer cement layer between the bricks and the membrane, the furan polymer membrane and the furan polymer cement layer between the membrane and the shell 34 are all strongly bonded together into an integral, flexible, resilient elastomeric mass which is highly resistant and impermeable to aqueous solutions of Ziegler catalyst and polyolefin-in-olefin monomer solutions.

The bonding of the furan polymer cement to the bricks, to the membrane and to the metal shell is quite strong and impervous to the aqueous solution of Ziegler catalyst and the polyolefin-in-olefin monomer solution so that the bricks and cement motar in between present an impervous, highly acid resistant surface.

Since the cement and membrane are of the same furan polymer it is believed that the bonding therebetween may be a chemical bonding which adds to imperveousness and strength.

The bricks are, in effect, floating in and on an elastomeric, flexible, yieldable resilient sea of furan polymer so that they can move freely with respect to the shell due to differential thermal expansion.

The bricks are preferably made as aforesaid of oven baked silica and alumina vitrified to an absorption value of 1½ to 2% which makes them quite impervious and resistant to the highly acidic aqueous solution of Ziegler type catalyst and to the polyolefin-in-olefin monomer solution. Preferably the bricks contain 20-30% alumina and 40-50% silica with the balance being oxygen. They do not contain furan polymer except to the extent that the polymer may permeate the surface pores thereof.

The large ports of the settling tank and mixer have the same lining as the equipment proper. The smaller cylindrical ports, e.g., for admitting nitrogen to provide a purge and the liquid inlets and outlets, etc., are lined with a more rigid furan polymer sleeve (instead of a brick layer) cemented through the furan polymer membrane intermediate liner to the wall of the port by the furan polymer cement with the membrane extending continuously over and cemented to the outer flanges of the port to prevent corrosion in case of back up of reaction mass. The sleeve extends inwardly beyond the inner end of the port through the brick lining of the equipment and is cemented to the edges of such liner through the membrane.

Brick linings of carbon steel chemical process equipment with polyvinyl (PVC) membranes and PVC cement, have been used in the past to achieve acid resistance but so far as is known they have never been used in the liquid phase polymerization of olefins or in any other systems employing a Ziegler catalyst, with respect to which the instant invention is particularly useful, as aforesaid.

Furthermore, as aforesaid, the furan polymer cement and membrane together with the silica-alumina bricks of the present invention are particularly advantageous with aqueous solutions of Ziegler catalyst in the polymerization of olefins, as compared to polyvinyl chloride, particularly because of their superior resistance to attack or leaching out by the polyolefin-in-olefin monomer solution while at the same time being highly resistant to attack by the Ziegler catalyst in aqueous solution.

With reference to FIG. 1, settler tank 20 is provided with a 4 inch thick (the thickness may vary over a wide range) layer of woven monel wire mesh 44, through which the mixture of reaction mass and water from reactor 2 flows. This layer 44 coalesces the water droplets to thereby cause them to settle more rapidly to the lower layer 46 of aqueous solution of Ziegler catalyst (aqueous phase). The upper layer of polymer dissolved in liquid monomer (oil phase) is represented in FIG. 1 as 48 and is drawn out of the tank at 21.

In manufacturing the brick lined equipment, a layer of furan polymer adhesive is applied to the inner wall of the carbon steel vessel. The membrane of precured furan polymer is then applied to this layer of adhesive, another layer of adhesive is then applied to the inner surface of the membrane. The bricks are then buttered with furan polymer adhesive on their outer and edge surfaces and laid on the last mentioned layer of adhesive followed by curing the entire mass.

Although one layer of bricks has been described and shown any number of layers may be used.

Also the thickness of the membrane may be varied over a wide range and the composition of the bricks may be varied substantially. A number of different acid resistant bricks are available on the market, which can be used, although a silica-alumina brick is preferred.

EXAMPLE

This example is given for a polypropylene plant having a capacity of 15,000,000 pounds of polypropylene per year.

The temperature, pressure, composition, construction and other properties of the various streams and equipment shown in FIG. 1 are set forth below with reference to the number representing the stream or element of the equipment appearing in FIG. 1.

Stream 4 — mixture of fresh liquid propylene feed at a rate of 1880 lbs./hr. and recycle liquid propylene recycled at a ratio of recycle to fresh feed to 5 to 10 (7 is preferred) recycle to 1 fresh feed at 100° F. and 550 psig and water content of 5–10 ppm.

Catalyst 6 — Conventional Ziegler catalyst (mixture of titanium tetrachloride and diethyl aluminum halide) 0.5 to 1 lb. catalyst per 1000 pounds of fresh monomer feed.

Hydrogen 8 — 0.05 to 0.15 lbs per 1000 pounds of fresh monomer feed to control polymer chain length Reactor 2 — Reactor temp. 145° F.
Pressure 450 psig
Completely liquid filled
Vigorous mixing to ensure good mixing of catalyst and $H_2$ with liquid monomer
Reaction mass outlet-polypropylene dissolved in liquid propylene monomer at 145° F. and 450 psig.
Ratio of polymer to liquid monomer — 20%
Reaction mass highly viscous.
Mixer 18 —
Reaction mass inlet — same as reaction mass outlet of reactor 16
Motionless Mixer (high shear intensive mixer) sold under that name by Kenics Incorporated
Water added at 150° F.
Exit is 180° F.- Δ T by heat of mixing-and 700 psig.
Settler 20 —
Inlet and outlet 180° F. and 700 psig
Residence time 1¼ hours — polymer in monomer oil phase goes to top — aqueous phase containing catalyst goes to bottom and is removed, neutralized and discarded
Heat Exchanger 24 —
Inlet 180° F. and 2500 psig achieved by pump (not shown) between settler 20 and heater 21
Outlet 380° F. and 2000 psig
Heating fluid — high boiling Dowtherm sold by Dow Corp. at 470°–500° F.

Flash Valve 26 — Mason Neilan reducing valve — inlet 380° F. and 2000 psig — outlet 1500 psig and 300° F. flashed monomer vapor contains less volatile oligomers and entrained polymer Flash Drum 28 —
Same conditions as exit from 26
Polymer exits at 30
Flashed monomer vapor with oligomers and entrained polymer exits at 32.

It will be understood that with polyolefins other than polypropylene the pressures must be adjusted to make sure that the olefin monomer is maintained in a liquid state.

Other furan polymers which may be used for the adhesive and the membrane are the polymers and copolymers of furfural or furfural and a ketone or hydrofurfuryl alcohol, etc.

The above description and accompanying drawings of a preferred embodiment of the invention are for purposes of illustration only and it is not intended that the invention be limited thereto or thereby but only to the methods claimed in the appended claims and their equivalents.

I claim:

1. A method of polymerizing olefins from liquid olefin monomer with a Ziegler type catalyst under positive pressure, in which the reaction mass comprises catalyst and polyolefin dissolved in liquid monomer and is mixed with water in a mixer to halt the reaction and in which the water with catalyst dissolved therein is separated from the reaction mass in a settling tank, and in which at least one of the mixer and settling tank comprises an outer shell the inner wall of which has a lining resistant to said aqueous solution of Ziegler catalyst and to said polyolefin-in-monomer solution, said lining comprising a layer of acid resistant bricks and an intermediate membrane between said layer of bricks and said inner wall, said bricks being mortared together and to said membrane and said membrane being cemented to said inner wall of said shell by a furan polymer cement and said membrane comprising a furan polymer.

2. A method according to claim 1, said furan polymer cement containing a particulate inert filler and said membrane being reinforced by acid inert fibers.

3. A method according to claim 1, said furan polymer being filled with carbon black and said membrane being reinforced with glass fibers.

* * * * *